United States Patent
Aota et al.

(10) Patent No.: US 12,491,302 B2
(45) Date of Patent: *Dec. 9, 2025

(54) BLOOD PURIFICATION SYSTEM

(71) Applicant: Nikkiso Company Limited, Tokyo (JP)

(72) Inventors: Naoyuki Aota, Shizuoka (JP);
Masahiro Toyoda, Shizuoka (JP);
Yasunobu Hagiwara, Shizuoka (JP)

(73) Assignee: Nikkiso Company Limited, Tokyo (JP)

( * ) Notice: Subject to any disclaimer, the term of this patent is extended or adjusted under 35 U.S.C. 154(b) by 366 days.

This patent is subject to a terminal disclaimer.

(21) Appl. No.: 16/704,550

(22) Filed: Dec. 5, 2019

(65) Prior Publication Data

US 2020/0108195 A1  Apr. 9, 2020

Related U.S. Application Data

(63) Continuation of application No. PCT/JP2018/022703, filed on Jun. 14, 2018.

(30) Foreign Application Priority Data

Jun. 14, 2017 (JP) ................................. 2017-116954

(51) Int. Cl.
*G16H 10/60* (2018.01)
*A61M 1/36* (2006.01)
(Continued)

(52) U.S. Cl.
CPC ........ *A61M 1/3607* (2014.02); *A61M 1/3653* (2013.01); *G16H 10/60* (2018.01);
(Continued)

(58) Field of Classification Search
CPC ........ G16H 20/40; G16H 10/60; G16H 20/10; G16H 40/63; G16H 50/70; A61M 1/3607;
(Continued)

(56) References Cited

U.S. PATENT DOCUMENTS 11,642,446 B2 * 5/2023 Aota ................... A61M 1/267
 705/2
11,948,673 B2 * 4/2024 Aota ................... G16H 50/70
(Continued)

FOREIGN PATENT DOCUMENTS

CN  1968722 A   5/2007
CN  101596333 A  12/2009
(Continued)

OTHER PUBLICATIONS

Potier, Elevated removal of middle molecules without significant albumin loss with mixed-dilution hemodiafiltration for patients unable to provide sufficient blood flow rates, 2013, Blood Purif, 36(2):78-83 (Year: 2013).*

(Continued)

*Primary Examiner* — Kambiz Abdi
*Assistant Examiner* — Tran N Nguyen
(74) *Attorney, Agent, or Firm* — Young Basile Hanlon & MacFarlane, P.C.

(57) ABSTRACT

A blood purification system is provided that is capable of effectively utilizing accumulated histories stored during blood purification treatment and that helps quickly and accurately grasp whether the current transition of a particular parameter is normal when compared with a transition of the particular parameter that is estimated from the histories. The blood purification system includes an extracting device capable of searching histories accumulated in a storage device and extracting, as an approximate history, a history including the particular parameter approximate to the particular parameter observed at the current time in the current session of blood purification treatment; an estimating device that estimates a transition of the particular parameter to be observed after the current time in the current session of blood purification treatment from the approximate history (Continued)

extracted by the extracting device; and a display control device capable of displaying the transition of the particular parameter estimated by the estimating device and the transition of the particular parameter observed in the current session of blood purification treatment simultaneously on a display.

20 Claims, 6 Drawing Sheets

(51) Int. Cl.
*G16H 20/10* (2018.01)
*G16H 20/40* (2018.01)

(52) U.S. Cl.
CPC ............ *G16H 20/10* (2018.01); *G16H 20/40* (2018.01); *A61M 2205/3576* (2013.01)

(58) Field of Classification Search
CPC ........ A61M 1/3653; A61M 2205/3576; A61M 1/14
USPC ........................................ 705/2–3
See application file for complete search history.

(56) References Cited

U.S. PATENT DOCUMENTS

| | | | | |
|---|---|---|---|---|
| 2004/0057037 | A1* | 3/2004 | Ohishi | A61M 1/166 356/39 |
| 2004/0111293 | A1 | 6/2004 | Firanek et al. | |
| 2005/0027784 | A1* | 2/2005 | Fusari | G06F 21/6245 709/200 |
| 2005/0102165 | A1* | 5/2005 | Oshita | A61M 1/14 705/3 |
| 2008/0319511 | A1* | 12/2008 | Pless | A61B 5/369 607/59 |
| 2009/0156988 | A1* | 6/2009 | Ferren | A61B 5/6862 604/65 |
| 2011/0004085 | A1* | 1/2011 | Mensinger | A61B 5/7275 600/365 |
| 2013/0274644 | A1* | 10/2013 | Hertz | A61M 1/1613 604/6.09 |
| 2013/0303961 | A1* | 11/2013 | Wolff | A61M 1/3403 604/5.04 |
| 2013/0346093 | A1* | 12/2013 | Goodgame | G06F 16/345 705/2 |
| 2015/0196699 | A9* | 7/2015 | Wilt | A61M 60/554 417/474 |
| 2015/0306301 | A1* | 10/2015 | Strohhoefer | A61M 1/3607 702/183 |
| 2016/0175508 | A1* | 6/2016 | Murakami | A61M 1/1613 210/96.2 |
| 2016/0196020 | A1* | 7/2016 | Utsugida | G06F 40/166 715/771 |
| 2019/0217002 | A1* | 7/2019 | Urakabe | G16H 20/40 |
| 2019/0255239 | A1* | 8/2019 | Goto | A61B 5/22 |
| 2020/0206405 | A1* | 7/2020 | Wyeth | A61M 1/1621 |
| 2020/0242566 | A1* | 7/2020 | Agarwal | G06N 7/01 |

FOREIGN PATENT DOCUMENTS

| | | |
|---|---|---|
| CN | 104346521 A | 2/2015 |
| EP | 2096566 A1 | 9/2009 |
| JP | 2007-289481 A | 11/2007 |
| JP | 2014-004194 A | 1/2014 |
| JP | 2015519133 A | 7/2015 |
| WO | 2013/173349 A2 | 11/2013 |
| WO | 2016/113069 A1 | 7/2016 |

OTHER PUBLICATIONS

Liu, Testing Statistical Significance of the Area under a Receiving Operating Characteristics Curve for Repeated Measures Design with Bootstrapping, 2005, Journal of Data Science 3, 257-278 (Year: 2005).*
Kohl, State-of-the art data normalization methods improve NMR-based metabolomic analysis, 2012, Metabolomics 8 (Suppl 1), 146-160 (Year: 2012).*
European Search Report for Application No. 18818871.8, dated Mar. 12, 2021.

* cited by examiner

BLOOD PURIFICATION SYSTEM

FIELD

The present invention relates to a blood purification system including a blood purification apparatus capable of giving blood purification treatment to a patient, and a managing apparatus capable of communicating with the blood purification apparatus in such a manner as to transmit and receive information on the blood purification treatment to and from the blood purification apparatus.

BACKGROUND

A dialysis apparatus as a blood purification apparatus is used in dialysis treatment or the like. A dialysis room in a medical facility such as a hospital is provided with a plurality of dialysis apparatuses so that dialysis treatment (blood purification treatment) can be given to many patients in the dialysis room. As disclosed by PTL 1 for example, each of such dialysis apparatuses is connected to a central monitoring apparatus (a managing apparatus) including a server, and is capable of receiving various pieces of information on patients that are stored in the server. In recent cases, pieces of information on dialysis treatment (for example, patients' past treatment data and so forth) are stored in the server of the central monitoring apparatus, and any of those pieces of information is displayed on a display according to need so that a medical worker such as a doctor can grasp the information. PTL 1: Japanese Unexamined Patent Application Publication No. 2014-4194 are incorporated by reference herein for all purposes.

SUMMARY

Such a known blood purification system can display information accumulated in the server and can make the medical worker or the like grasp the information. However, there has been a problem that making an appropriate and quick action during the treatment in response to the information requires a certain level of skill. For example, in some cases, simply accumulating histories cannot help appropriately grasp whether the transition of a particular parameter (a parameter related to the treatment and that changes with time during the blood purification treatment) observed in the current session of treatment is normal when compared with those stored as the histories.

The present invention has been conceived in view of the above circumstances and provides a blood purification system that is capable of effectively utilizing accumulated histories stored during blood purification treatment and that helps quickly and accurately grasp whether the current transition of a particular parameter is normal when compared with a transition of the particular parameter that is estimated from the histories.

According to the teachings herein, there is provided a blood purification system comprising a blood purification apparatus capable of giving blood purification treatment to a patient; a managing apparatus capable of communicating with the blood purification apparatus in such a manner as to transmit and receive information on the blood purification treatment to and from the blood purification apparatus, the managing apparatus including a storage device capable of storing the information on the blood purification treatment in a time course with progress of the treatment and accumulating the information as a history for each treatment session; and a display provided to the blood purification apparatus or to the managing apparatus and being capable of displaying the information on the blood purification treatment. The history includes a particular parameter related to the treatment that changes with time during the blood purification treatment. The blood purification system includes an extracting device capable of searching the histories accumulated in the storage device and extracting, as an approximate history, a history including the particular parameter approximate to the particular parameter observed at a current time in a current session of blood purification treatment or a history including the particular parameter exhibiting a transition approximate to a transition of the particular parameter observed until the current time in the current session of blood purification treatment; an estimating device that estimates a transition of the particular parameter to be observed after the current time in the current session of blood purification treatment from the approximate history extracted by the extracting device; and a display control device capable of displaying the transition of the particular parameter estimated by the estimating device and the transition of the particular parameter observed in the current session of blood purification treatment simultaneously on the display.

According to the teachings herein, in the blood purification system taught herein, the extracting device is capable of searching the histories including not only the histories of a patient to whom the blood purification treatment is going to be given but also the histories of any other patient and extracting an approximate history therefrom.

According to the teachings herein, in the blood purification system taught herein, the display control device is capable of displaying information on the current session of blood purification treatment as a graph with progress of time, and is capable of displaying the transition of the particular parameter estimated by the estimating device with reference to a time axis of the graph.

According to the teachings herein, in the blood purification system taught herein, the display control device is capable of displaying an upper-limit transition and a lower-limit transition of the particular parameter that are estimated by the estimating device as graphs respectively.

According to the teachings herein, the blood purification system taught herein further includes an input device through which a past time before the current time in the current session of blood purification treatment is specifiable. Furthermore, the extracting device is capable of searching the histories including the particular parameter approximate to the particular parameter observed at the time inputted through the input device and extracting the history as an approximate history.

According to the teachings herein, in the blood purification system taught herein, if a past time is specified through the input device, the display control device becomes capable of displaying a graph starting from the specified past time.

According to the teachings herein, in the blood purification system taught herein, the display control device is capable of displaying the transition of the particular parameter estimated by the estimating device in a distinguishable manner.

According to the teachings herein, the blood purification system includes the extracting device capable of searching the histories accumulated in the storage device and extracting, as an approximate history, a history including the particular parameter approximate to the particular parameter observed at the current time in the current session of blood purification treatment or a history including the particular parameter exhibiting a transition approximate to the transition of the particular parameter observed until the current time in the current session of blood purification treatment; the estimating device that estimates a transition of the particular parameter to be observed after the current time in the current session of blood purification treatment from the approximate history extracted by the extracting device; and the display control device capable of displaying the transition of the particular parameter estimated by the estimating device and the transition of the particular parameter observed in the current session of blood purification treatment simultaneously on the display. Therefore, the medical worker can easily compare the transition of the particular parameter estimated from the histories and the transition of the particular parameter observed in the current session of blood purification treatment. Consequently, the accumulated histories stored during the blood purification treatment can be effectively utilized, and whether the current transition of the particular parameter is normal when compared with the transition of the particular parameter estimated from the histories can be grasped quickly and accurately.

According to the teachings herein, the extracting device is capable of searching the histories including not only the histories of the patient to whom the blood purification treatment is going to be given but also the histories of any other patient and extracting an approximate history therefrom. Therefore, the accumulated amount of histories that can be extracted by the extracting device can be increased. Accordingly, the particular parameter to be observed after the current time in the current session of blood purification treatment can be estimated more accurately.

According to the teachings herein, the display control device is capable of displaying information on the current session of blood purification treatment as a graph with the progress of time, and is capable of displaying the transition of the particular parameter estimated by the estimating device with reference to the time axis of the graph. Therefore, the transition of the particular parameter observed at the current time and the transition of the particular parameter estimated from the histories can be compared visually.

According to the teachings herein, the display control device is capable of displaying the upper-limit transition and the lower-limit transition of the particular parameter that are estimated by the estimating device as graphs respectively. Therefore, the transition of the particular parameter estimated from the histories can be displayed with a certain range defined by the upper limit and the lower limit. Hence, the reliability can be increased further.

According to the teachings herein, the blood purification system further includes the input device through which a past time before the current time in the current session of blood purification treatment is specifiable. Furthermore, the extracting device is capable of searching the histories including the particular parameter approximate to the particular parameter observed at the time inputted through the input device and extracting the history as an approximate history. Therefore, not only the transition of the particular parameter to be observed after the current time in the current session of blood purification treatment but also the transition of the particular parameter starting from a past time before the current time in the current session of blood purification treatment can be displayed.

According to the teachings herein, if a past time is specified through the input device, the display control device becomes capable of displaying a graph starting from the specified past time. Therefore, the transition of the particular parameter observed at the past time before the current time in the current session of blood purification treatment can be grasped visually.

According to the teachings herein, the display control device is capable of displaying the transition of the particular parameter estimated by the estimating device in a distinguishable manner. Therefore, the medical worker can more easily and assuredly compare the transition of the particular parameter estimated from the histories and the transition of the particular parameter observed during the current session of blood purification treatment.

DETAILED DESCRIPTION

Embodiments of the present invention will now be described specifically with reference to the drawings.

Figure 1:
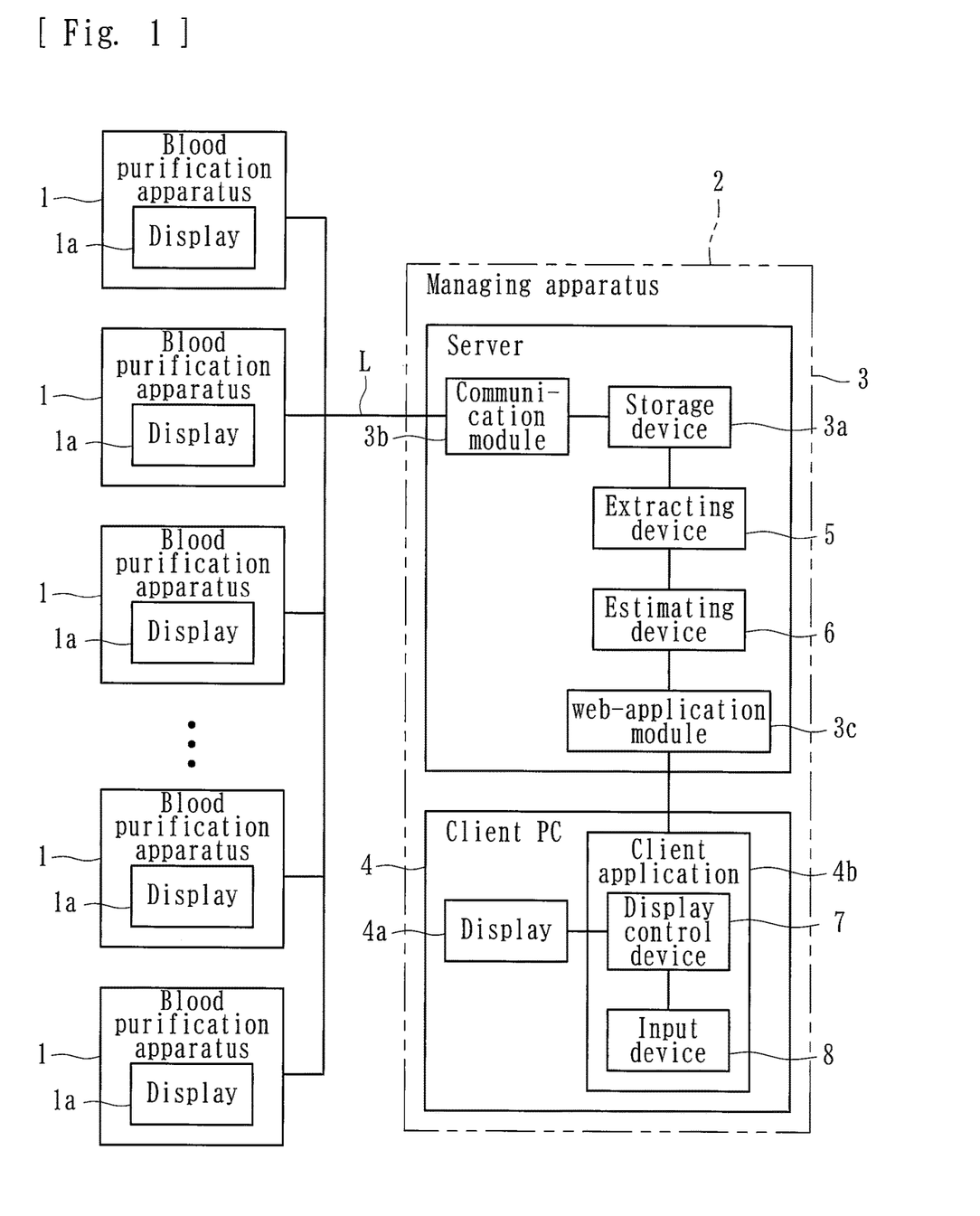
FIG. 1 is a block diagram of a blood purification system according to a first embodiment of the present invention.

A blood purification system according to a first embodiment is capable of giving dialysis treatment as blood purification treatment to patients and includes, as illustrated in FIG. 1, blood purification apparatuses 1 and a managing apparatus 2. The blood purification apparatuses 1 and the managing apparatus 2 are electrically connected to each other through LAN cables (L). Hence, the blood purification apparatuses 1 and the managing apparatus 2 can communicate with each other in such a manner as to transmit and receive information on the blood purification treatment to and from each other.

Figure 3:
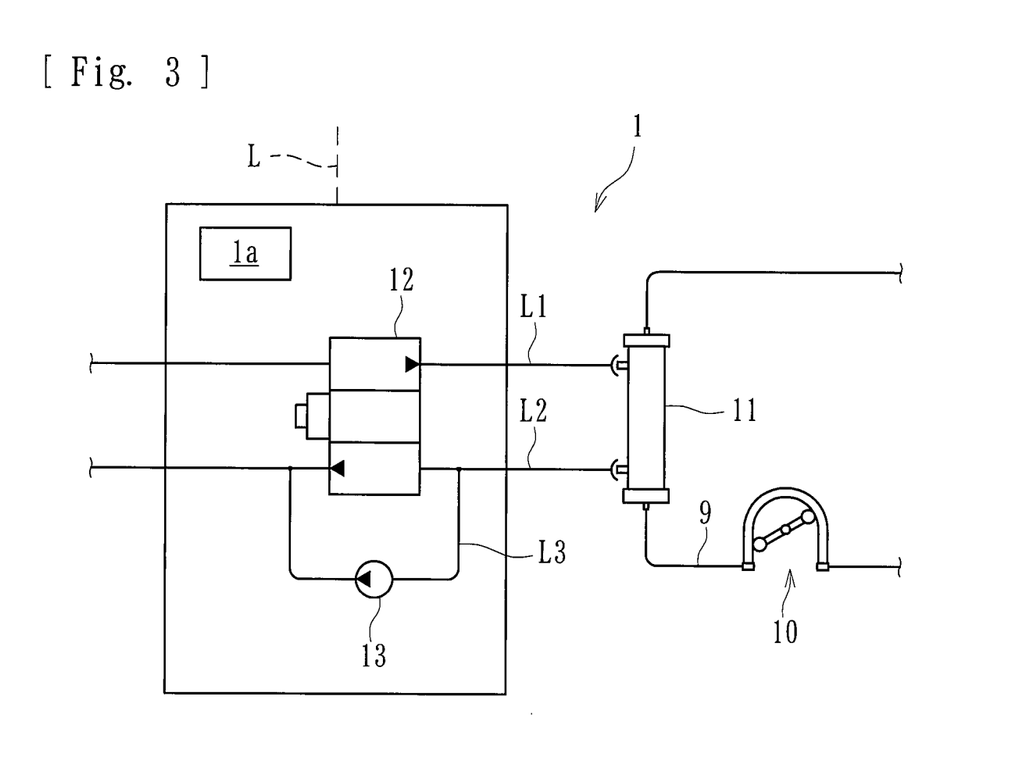
FIG. 3 is a schematic diagram illustrating an internal configuration and a blood circuit of the blood purification apparatus included in the blood purification system.

As illustrated in FIG. 3, each of the blood purification apparatuses 1 includes a dialysate introduction line L1 for introducing dialysate, a dialysate drain line L2 through which waste dialysate is drained, and a duplex pump 12 provided over the dialysate introduction line L1 and the dialysate drain line L2. A dialyzer 11 (a blood purifier) is connected to the dialysate introduction line L1 and to the dialysate drain line L2. A blood circuit 9 through which blood of a patient is caused to extracorporeally circulate is connected to the dialyzer 11. When a blood pump 10 is activated, the blood of the patient is caused to extracorporeally circulate through the blood circuit 9 and can be purified by the dialyzer 11.

A pump chamber of the duplex pump 12 is divided by a single plunger, not illustrated, into a delivery-side pump chamber connected to the dialysate introduction line L1 and a drain-side pump chamber connected to the dialysate drain line L2. When the plunger undergoes a reciprocal motion, the dialysate or a cleaning solution delivered to the delivery-side pump chamber is supplied to the dialyzer 11, while the dialysate in the dialyzer 11 is taken into the drain-side pump chamber.

The dialysate drain line L2 is provided with a bypass line L3 that bypasses the duplex pump 12. The bypass line L3 is provided with an ultrafiltration pump 13 at a halfway position thereof. When the ultrafiltration pump 13 is activated, the blood of the patient that is flowing in the dialyzer 11 can be ultrafiltered. The duplex pump 12 may be replaced with a device of a so-called chamber type.

The blood purification apparatus 1 further includes a display 1a and various treatment devices (for example, the blood pump, an infusion pump, a syringe pump, and so forth) related to blood purification treatment (hemodialysis treatment). The treatment devices are not limited to actuators such as pumps and may include various general devices intended for blood purification treatment: namely, clamping devices such as electromagnetic valves, and monitoring devices for monitoring hydraulic pressure and so forth.

The display 1a is capable of displaying predetermined information on the blood purification treatment (hemodialysis treatment) and accepts predetermined input. The display 1a according to the present embodiment is a touch panel that accepts predetermined input made by touching on a corresponding one of positions of a screen thereof. The information on the blood purification treatment that is displayed on the display 1a includes a setting value representing the flow rate of the blood pump 10, the ultrafiltration pump 13, the infusion pump, or the like; the venous pressure detected by a venous pressure sensor; and the hematocrit value or the like detected by a hematocrit sensor or the like.

Figure 2:
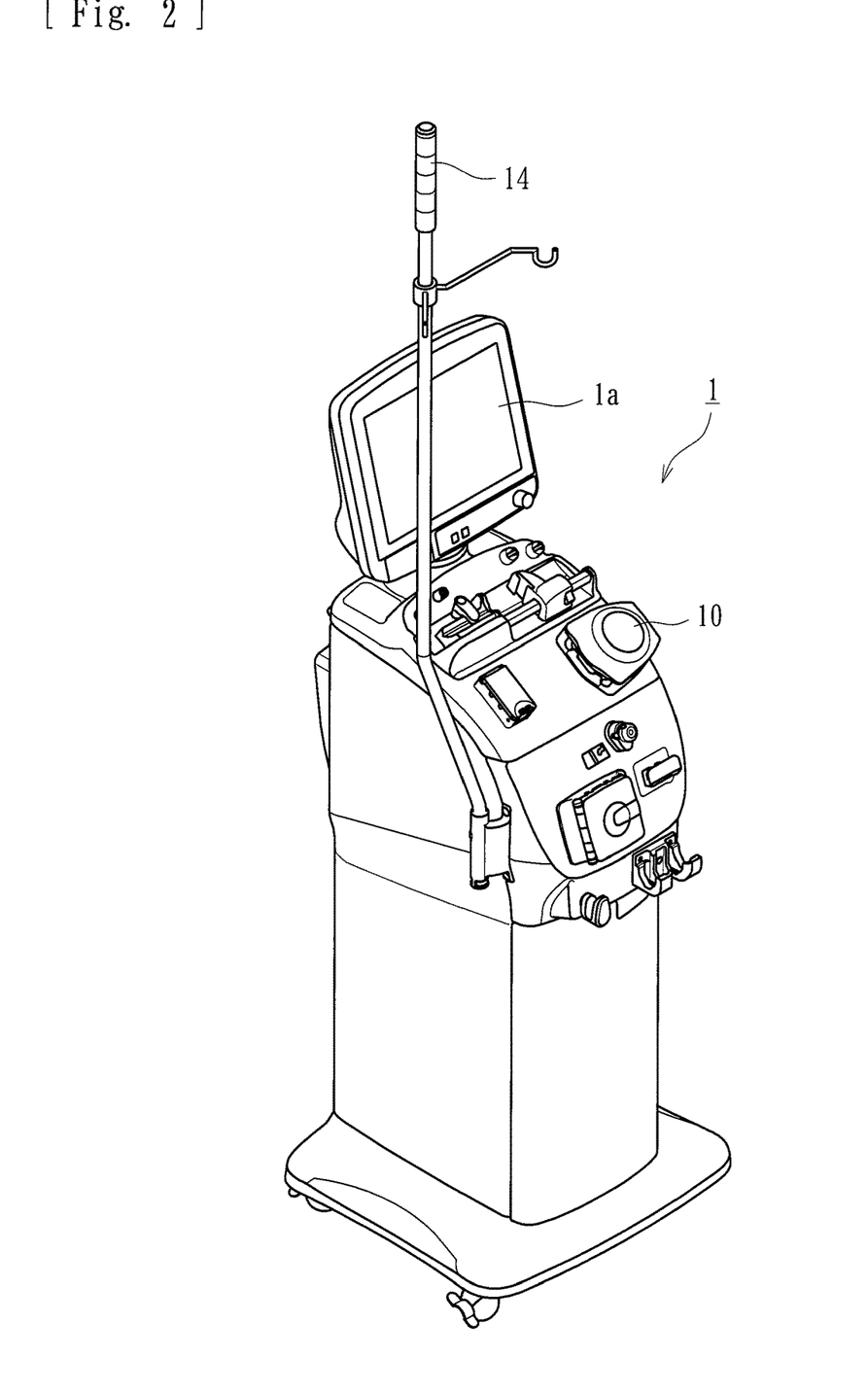
FIG. 2 is a diagram illustrating an appearance of a blood purification apparatus included in the blood purification system.

The blood purification apparatus 1 further includes a speaker capable of generating any type of output (output such as a voice or a sound effect). The speaker makes it possible to generate an alarm or a warning for notifying anyone nearby of the occurrence of an abnormality in any of the devices operating for the blood purification treatment or in the patient, and to give the operator a guidance, with a voice or the like, on how to handle the blood purification apparatus or how to make various settings. The blood purification apparatus 1 further includes an external indicator lamp 14 (see FIG. 2). The external indicator lamp 14 is turned on or is made to blink so that anybody nearby can notice the warning or the like more assuredly.

The managing apparatus 2 includes a server 3 and a client PC 4. The server 3 includes a communication module 3b for communication with the blood purification apparatuses 1 through the LAN cables L, a storage device 3a serving as a database in which data is accumulatable, a web-application module 3c that activates a client application 4b included in the client PC 4, an extracting device 5, and an estimating device 6. The client PC 4 is provided in a treatment room in which the blood purification apparatuses 1 are installed. The server 3 is provided in another room (such as a computer room) separate from the treatment room.

The storage device 3a is capable of communicating with each of the blood purification apparatuses 1 through the communication module 3b. The storage device 3a is also capable of storing information on the blood purification treatment in a time course with the progress of the treatment and accumulating the information as a history for each treatment session. For example, information transmitted from the managing apparatus 2 to each blood purification apparatus 1 (information required for the current treatment session) includes setting information on the blood purification apparatus 1, master information that enables selection of a below-described particular incident that has occurred unsteadily, personal information (such as dry weight (DW), medication instructions, and test values) on the patient to be treated, and so forth.

Information (the history) transmitted from each blood purification apparatus 1 to the managing apparatus 2 includes monitoring information on the blood purification apparatus 1, warnings and notifications generated by the blood purification apparatus 1, a record of actions including a log of operations performed in response to the warnings and notifications, self-diagnostic information on the blood purification apparatus 1, information on the patient's blood pressure and pulse measured by a blood pressure monitor provided to the blood purification apparatus 1, information on the patient's temperature inputted to the blood purification apparatus 1 by the operator, identification codes selected from the master information by the medical worker, and so forth.

The history includes particular parameters related to the treatment and that change with time during the blood purification treatment. The particular parameters include a parameter detected by a predetermined sensor during the blood purification treatment, a setting parameter for an actuator such as the blood pump or the ultrafiltration pump, and so forth. Specifically, the particular parameters include $\Delta BV$ (venous pressure), hematocrit value, PRR, ultrafiltration rate, Kt/V, and so forth.

The storage device 3a is capable of associating various pieces of information with one another and accumulating the pieces of information as a history for each treatment session. The pieces of information to be associated with one another include transitions of the respective particular parameters, the name of the patient treated, the place of treatment, the blood purification apparatus used, information transmitted and received to and from the blood purification apparatus 1 during the treatment, actual values such as the patient's body weights before and after the treatment and the volume and rate of ultrafiltration, treatment conditions, the record of medicines given during the treatment, the record of medical materials used for the treatment, the record of care, and so forth.

Thus, the storage device 3a can store the information on the blood purification treatment in a time course with the progress of the treatment (for example, sequentially from when the patient enters the dialysis room until the patient leaves the dialysis room after the completion of the treatment) and can accumulate the information as a history for each treatment session (each dialysis date). Furthermore, the storage device 3a can store the times of occurrence of particular incidents, such as generation of a warning, on the basis of their kinds and in correspondence with the time in the history. Hence, the storage device 3a can store what kind of particular incident has occurred after how many minutes from the start of a particular one of the past treatment sessions.

The extracting device 5 is capable of searching the histories accumulated in the storage device 3a and extracting, as an approximate history, a history including a particular parameter of interest approximate to that observed at the current time in the current session of blood purification treatment. When a particular parameter that needs to be grasped by the medical worker is selected (particular parameters of different kinds are also selectable) and is inputted (specifically, when an identification code corresponding to a desired particular parameter is inputted) through the display 1a or the input device 8, the extracting device 5 according to the present embodiment can search the histories stored and accumulated in the storage device 3a and can extract a particular parameter that exhibits an approximate transition.

A specific method of extraction by the extracting device 5 is as follows, for example. When a particular parameter (such as Kt/V or the like) desired to estimate and conditions relevant thereto are inputted through the input device 8 or the like with a predetermined timing during the current session of blood purification treatment, the extracting device 5 searches for a history exhibiting an approximate value within a predetermined time range (a preset period) starting from the current time. The range (scanning range) for which judgement of approximation is to be made is set in advance for each of different kinds of particular parameters. For example, a period between a point where the value of the particular parameter is greater than the current value of the parameter by a predetermined amount (i.e. the upper limit of the threshold for scanning) and a point where the value of the particular parameter is smaller than the current value of the parameter by a predetermined amount (i.e. the lower limit of the threshold for scanning) may be set in advance as the scanning range.

Alternatively, the entire period of each of the histories accumulated in the storage device 3a may be set as the range of search, or the range to be searched may be made specifiable. When a particular parameter (such as Kt/V or the like) desired to estimate and conditions relevant thereto are inputted through the input device 8 or the like with a predetermined timing during the treatment, any of all histories within the above scanning range starting from the current time can be extracted as an approximate history.

Figure 6:
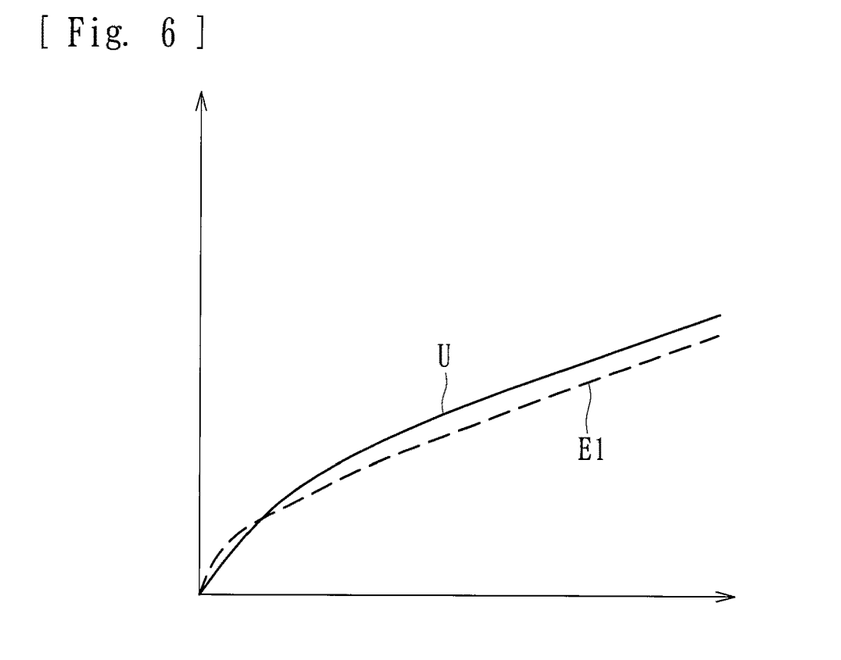
FIG. 6 is a schematic diagram for describing a method of extraction performed by an extracting device included in the blood purification system.
Figure 7:
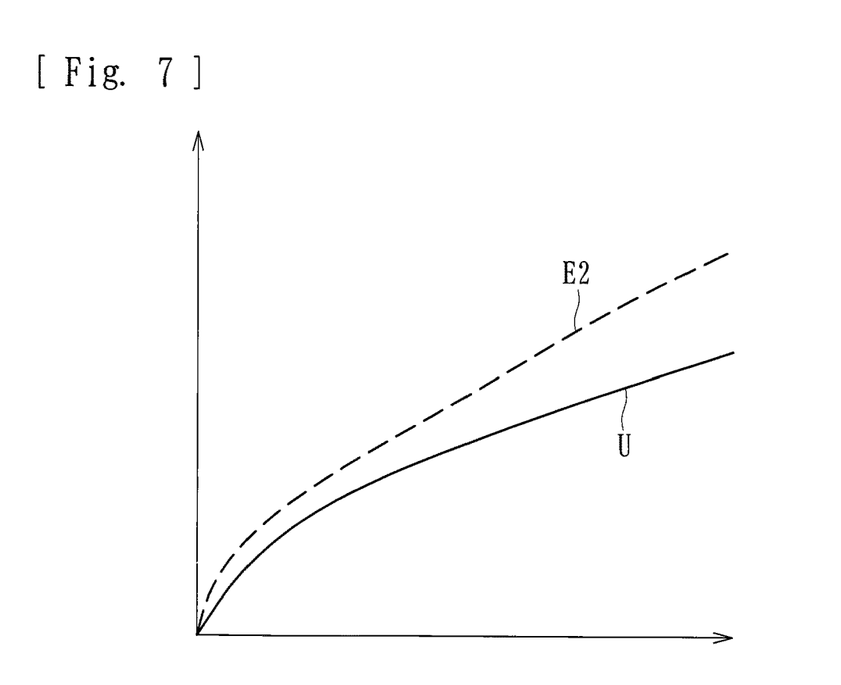
FIG. 7 is a schematic diagram for describing a method of extraction performed by the extracting device included in the blood purification system.

As another method of extraction, the extracting device 5 may be capable of searching the histories accumulated in the storage device 3a and extracting, as an approximate history, a history including the particular parameter of interest exhibiting a transition approximate to that observed until the current time in the current session of blood purification treatment. In such a case, as illustrated in FIGS. 6 and 7, a transition of a particular parameter (U) observed until the current time in the current session of blood purification treatment and a transition of the particular parameters (E1, E2) in a specified one of the histories accumulated in the storage device 3a are superposed on each other, and the area of difference between the two is calculated.

For example, the extracting device 5 may be configured as follows. If the area of difference between the transition of the particular parameter (U) observed until the current time and the transition of the particular parameter E1 stored as the history (see FIG. 6) does not exceed a predetermined threshold, the particular parameter E1 is extracted as an approximate history. If the area of difference between the transition of the particular parameter (U) observed until the current time and the transition of the particular parameter E2 stored as the history (see FIG. 7) exceeds the predetermined threshold, the particular parameter E2 is not extracted as an approximate history.

The present embodiment concerns a case where the range from which the extracting device 5 extracts a particular parameter is limited to the histories of the patient to whom the blood purification treatment is going to be given. Alternatively, the extracting device 5 may extract a particular parameter from a range including histories of other patients. In the latter case, the other patients acceptable as additional conditions include patients having a similar symptom, patients of the same sex, patients of the same or a close age, patients having the same or a similar primary disease, and patients having the same or a close DW (dry weight) or test value. In addition, the medical worker may arbitrarily include or exclude other patients into or from the range of extraction by the extracting device 5. That is, the medical worker may select patients to be included in the range of extraction for each particular parameter.

The estimating device 6 estimates a transition of a particular parameter to be observed after the current time in the current session of blood purification treatment from the approximate history extracted by the extracting device 5. Specifically, the estimating device 6 according to the present embodiment is capable of analyzing all approximate histories extracted by the extracting device 5, calculating upper limits and lower limits for respective time slots, and connecting the upper limits to one another as an estimated upper-limit transition and the lower limits to one another as an estimated lower-limit transition.

More specifically, if all of the extracted approximate histories are graphed with one specific time axis, the greatest value and the smallest value at every point in time can be identified. Accordingly, a graph as a series of the greatest values and a graph as a series of the smallest values are obtained. The transition of the upper limit and the transition of the lower limit that are obtained as above are estimated as a transition of the particular parameter to be observed after the current time in the current session of blood purification treatment. Such a transition of a particular parameter to be observed after the current time may alternatively be estimated by any other mathematical or graphical method.

The client PC 4 is a personal computer and includes a display 4a and the client application 4b. The display 4a is a liquid-crystal screen or a touch panel that is capable of displaying information on the blood purification treatment. The client application 4b is connected to the web-application module 3c of the server 3, whereby information on the blood purification treatment can be inputted thereto and outputted therefrom. The client application 4b includes a display control device 7 and the input device 8.

Figure 4:
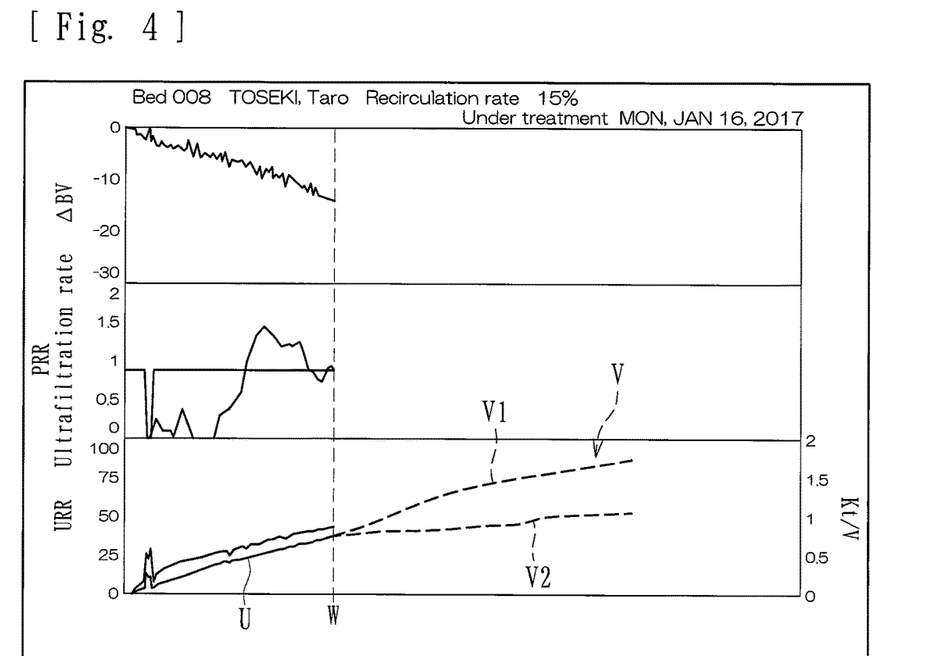
FIG. 4 is a schematic diagram illustrating a state in which a transition of a particular parameter that is estimated by an estimating device, included in the blood purification system, to be observed after the current time in the current session of blood purification treatment is displayed.

The display control device 7 is capable of displaying the transition of the particular parameter estimated by the estimating device 6 and the transition of the particular parameter observed during the current session of blood purification treatment simultaneously on the display 4a. Specifically, as illustrated in FIG. 4, the display control device 7 according to the present embodiment is capable of displaying a particular parameter as information on the current session of blood purification treatment as a graph with the progress of time (the case illustrated in the drawing includes, with the horizontal axis representing the time axis, a line graph of ΔBV in an upper part, line graphs of PRR and ultrafiltration rate in a middle part, and line graphs of URR and Kt/V in a lower part), and is also capable of displaying a transition (V) of the particular parameter estimated by the estimating device 6 with reference to the time axis of the graph.

That is, as illustrated in the drawing, the transition of Kt/V observed during the current session of blood purification treatment is displayed as a transition of a particular parameter. Simultaneously, with a current time (W) in the graph being defined as the start point, a transition of the particular parameter (Kt/V in this case) estimated by the estimating device 5 is displayed. In particular, as illustrated in the drawing, the display control device 7 according to the present embodiment displays an upper-limit transition V1 and a lower-limit transition V2 of the particular parameter that are estimated by the estimating device 5 as graphs and displays the transition (V) (including the upper-limit transition V1 and the lower-limit transition V2) of the particular parameter estimated by the estimating device 5 in a distinguishable manner (in the present embodiment, the transition (V) is represented by dotted lines).

Figure 5:
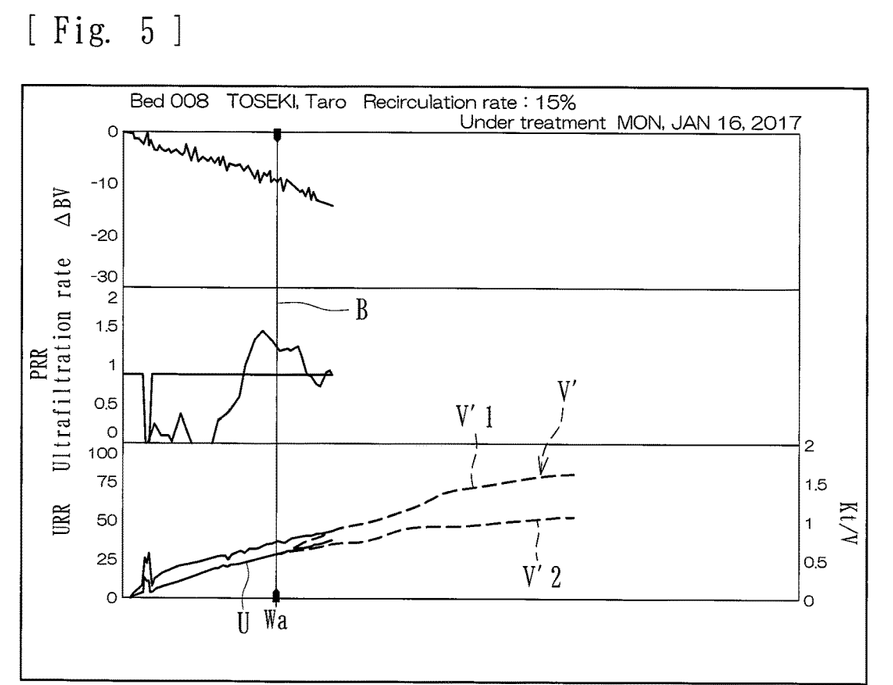
FIG. 5 is a schematic diagram illustrating a state in which a transition of a particular parameter that is estimated by the estimating device, included in the blood purification system, to be observed after a past time before the current time in the current session of blood purification treatment is displayed.

Furthermore, in the present embodiment, a point before the current time (W) in the current session of blood purification treatment is specifiable through the input device 8. Therefore, the extracting device 5 can search for any history including the particular parameter of interest approximate to that observed at the point inputted through the input device 8, and can then extract that history as an approximate history. For example, as illustrated in FIG. 5, if a time-shift bar (B) movable in the graph with an operation on the input device 8 is displayed, a past time Wa before the current time (W) can be specified.

When a past time Wa is specified by using the time-shift bar B, the extracting device 5 searches for any history including the particular parameter of interest approximate to that observed at the past time Wa and extracts that history as an approximate history. Then, the estimating device 6 estimates a transition of the particular parameter to be observed after the time Wa from the extracted approximate history. A transition (V') of the particular parameter estimated as above by the estimating device 6 is displayed as a graph starting from the specified past time Wa. In such a case as well, the transition (V') of the particular parameter estimated by the estimating device 6 is displayed as an upper-limit transition V'1 and a lower-limit transition V'2, which are displayed in such a manner as to be distinguishable (in the present embodiment, represented by dotted lines) from the transition (U) of the particular parameter.

The display control device 7 according to the present embodiment is capable of displaying the information on the current session of blood purification treatment as a graph (the transition (U)) with the progress of time, and the transitions (V, V') of the particular parameter estimated by the estimating device 6 as the upper-limit transitions (V1, V'1) and the lower-limit transitions (V2, V'2). Alternatively, the information may be displayed in any other form (for example, as a transition of the average value or the like).

The extraction of an approximate history by the extracting device 5 and the estimation of the transition of a particular parameter by the estimating device 6 are preferably performed when a particular parameter desired to estimate is specified through the input device 8, or when a past time Wa is specified with the time-shift bar (B) operated through the input device 8. While the present embodiment concerns a case where Kt/V is specified as the particular parameter, another particular parameter may be specified through the input device 8 so that the transition of that particular parameter can be estimated. Furthermore, while the present embodiment concerns a case where the particular parameter estimated by the estimating device 6 is made distinguishable by being displayed as a dotted line, the estimated particular parameter may be made distinguishable in any other way, for example, by being displayed in a different color.

According to the above embodiment, the blood purification system includes the extracting device 5 capable of searching the histories accumulated in the storage device 3a and extracting, as an approximate history, a history including the particular parameter approximate to the particular parameter observed at the current time in the current session of blood purification treatment or a history including the particular parameter exhibiting a transition approximate to the transition of the particular parameter observed until the current time in the current session of blood purification treatment; the estimating device 6 that estimates a transition of the particular parameter to be observed after the current time in the current session of blood purification treatment from the approximate history extracted by the extracting device 5; and the display control device 7 capable of displaying the transition of the particular parameter estimated by the estimating device 6 and the transition of the particular parameter observed in the current session of blood purification treatment simultaneously on the display 4a. Therefore, the medical worker can easily compare the transition of the particular parameter estimated from the histories and the transition of the particular parameter observed in the current session of blood purification treatment. Consequently, the accumulated histories stored during the blood purification treatment can be effectively utilized, and whether the current transition of the particular parameter is normal when compared with the transition of the particular parameter estimated from the histories can be grasped quickly and accurately.

Specifically, the medical worker can grasp a sign of possible occurrence of any abnormality in the transition of the particular parameter in advance during the current session of blood purification treatment. Therefore, preparations and confirmations for such abnormality can be made in advance, and an action in response to the occurrence of the abnormality can be taken quickly and appropriately. Furthermore, since frequent-occurrence time slots of the particular incidents can be summarized automatically, not manually by the operator, the number of steps of operation can be reduced. Moreover, since factors such as the threshold and the scanning time slot for estimating the particular parameter can be set arbitrarily on the basis of viewpoints of experienced and high-skill medical workers, even unexperienced and low-skill medical workers can grasp the frequent-occurrence time slots of the particular incidents to be paid attention to.

The extracting device 5 according to the present embodiment is capable of searching the histories not only the histories of the patient to whom the blood purification treatment is going to be given but also the histories of any other patient and extracting an approximate history therefrom. Therefore, the accumulated amount of histories that can be extracted by the extracting device 5 can be increased. Accordingly, the particular parameter to be observed after the current time in the current session of blood purification treatment can be estimated more accurately.

The display control device 7 according to the present embodiment is capable of displaying information on the current session of blood purification treatment as a graph with the progress of time, and is capable of displaying the transition of the particular parameter estimated by the estimating device 6 with reference to the time axis of the graph. Therefore, the transition of the particular parameter observed at the current time and the transition of the particular parameter estimated from the histories can be compared visually. In particular, the display control device 7 according to the present embodiment is capable of displaying the upper-limit transition and the lower-limit transition of the particular parameter that are estimated by the estimating device 6 as graphs respectively. Therefore, the transition of the particular parameter estimated from the histories can be displayed with a certain range defined by the upper limit and the lower limit. Hence, the reliability can be increased further.

The blood purification system further includes the input device 8 through which a past time before the current time in the current session of blood purification treatment is specifiable. Furthermore, the extracting device 5 is capable of searching the histories including the particular parameter approximate to the particular parameter observed at the time inputted through the input device 8 and extracting the history as an approximate history. Therefore, not only the transition of the particular parameter to be observed after the current time in the current session of blood purification treatment but also the transition of the particular parameter starting from a past time before the current time in the current session of blood purification treatment can be displayed. In particular, if a past time is specified through the input device 8, the display control device 7 becomes capable of displaying a graph starting from the specified past time. Therefore, the transition of the particular parameter observed at the past time before the current time in the current session of blood purification treatment can be grasped visually.

The display control device 7 according to the present embodiment is capable of displaying the transition of the particular parameter estimated by the estimating device 5 in a distinguishable manner. Therefore, the medical worker can more easily and assuredly compare the transition of the particular parameter estimated from the histories and the transition of the particular parameter observed during the current session of blood purification treatment.

Now, a second embodiment of the present invention will be described.

Figure 8:
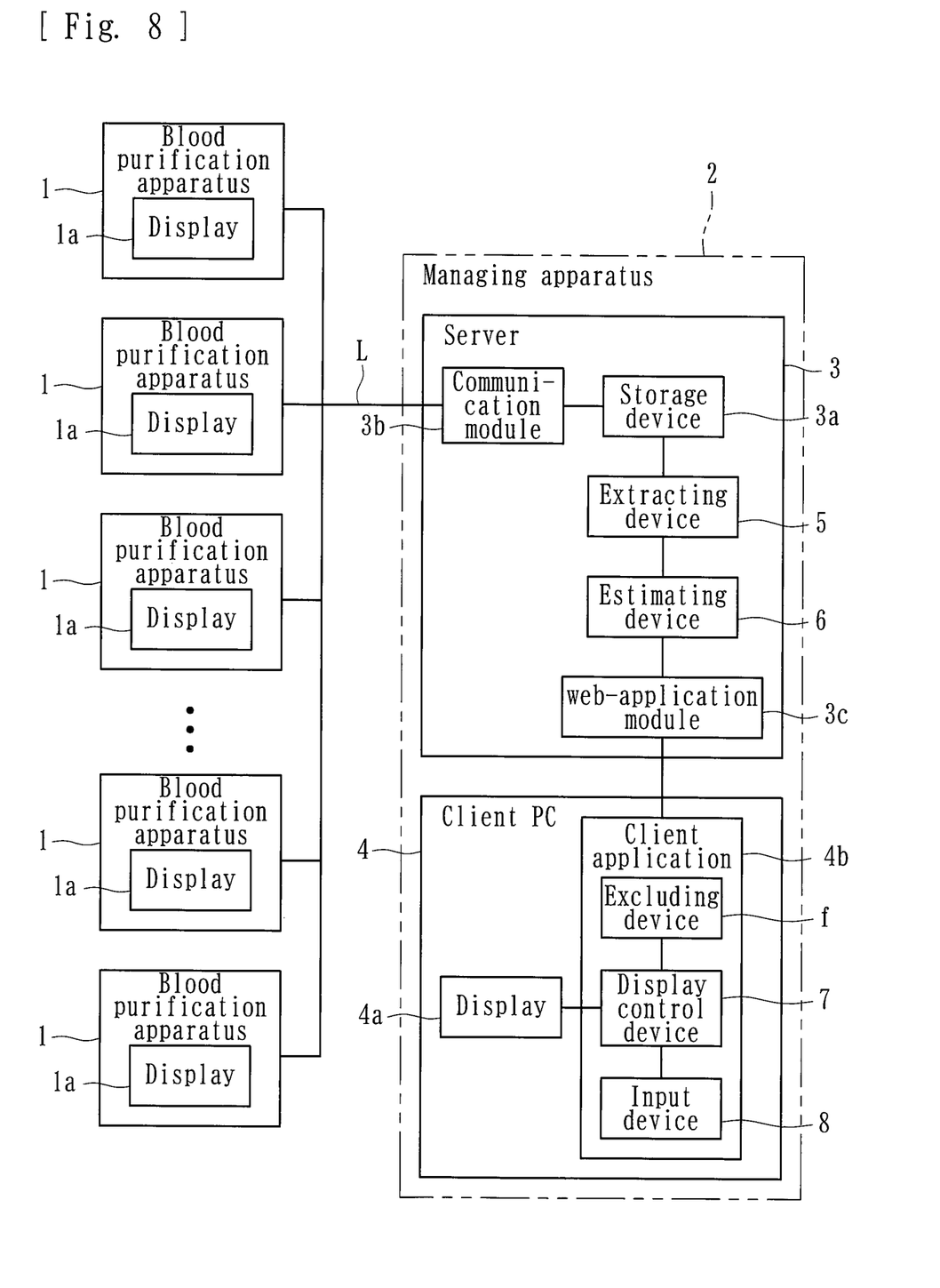
FIG. 8 is a block diagram of a blood purification system according to a second embodiment of the present invention.

As with the case of the first embodiment, a blood purification system according to the present embodiment is capable of giving dialysis treatment as blood purification treatment to patients and includes, as illustrated in FIG. 8, blood purification apparatuses 1 and a managing apparatus 2. The blood purification apparatuses 1 and the managing apparatus 2 are electrically connected to each other through LAN cables (L). Hence, the blood purification apparatuses 1 and the managing apparatus 2 can communicate with each other in such a manner as to transmit and receive information on the blood purification treatment to and from each other. Elements that are the same as those described in the first embodiment are denoted by corresponding ones of the reference numerals, and detailed description of such elements is omitted.

The client application 4b of the managing apparatus 2 according to the present embodiment includes an excluding device (f). The excluding device (f) is capable of excluding any of the histories accumulated in the storage device 3a from the object of search to be performed by the extracting device 5. Hence, the extracting device 5 according to the present embodiment can extract a history with an approximate particular parameter by searching histories accumulated in the storage device 3a except those excluded by the excluding device (f).

The excluding device (f) according to the present embodiment allows the medical worker or the like to select and specify any history to be excluded from the object of search (i.e. from the histories accumulated in the storage device 3a) by, for example, checking or unchecking relevant checkboxes on the client application 4b. Exemplary items to be excluded by the excluding device (f) include histories except those of the current patient who is going to take blood purification treatment, patients other than the current patient and of a different sex or different ages, patients not having the same or a similar primary disease, patients not having the same or a close DW (dry weight) or test value, and so forth.

The excluding device (f) may be configured such that items to be excluded from the object of search performed by the extracting device 5 can be specified on the history basis. In such a case, the entirety of the history of a single treatment session can be excluded from the object of search. Hence, information that is unfavorable for performing highly accurate extraction can be excluded by units of treatment session. Furthermore, the excluding device (f) is capable of excluding any specified kind of data included in the histories (in the present embodiment, any specified kind of particular incident) from the object of search. In such a case, the object of exclusion can be specified more precisely. In addition to the exclusion on the basis of the kind of data, exclusion on the basis of treatment date or the like is also possible. In such a case, the object of exclusion may be specified on a matrix screen.

According to the present embodiment, the blood purification system includes the extracting device 5 capable of searching for and extracting any history satisfying a predetermined condition from among the histories accumulated in the storage device 3a, the excluding device (f) capable of excluding any of the histories accumulated in the storage device 3a from the object of search performed by the extracting device 5, and the display control device 7 capable of displaying various pieces of information based on the history extracted by the extracting device 5 on the display 4a. Therefore, any information that is unfavorable as the information to be extracted by the extracting device 5 can be excluded from the information accumulated in the storage device 3a. Hence, information necessary for the medical worker can be accurately displayed and grasped by the medical worker.

For example, if an action that is being taken in response to a warning generated by the blood purification apparatus 1 is inappropriate, the warning may be generated repeatedly. In such a case, although it should be recorded that a particular incident (generation of a warning) has occurred once, it is actually recorded in the history that the particular incident has occurred the number of times of repetition. To avoid such a situation, if the second and subsequent occurrences of the particular incident are excluded by the excluding device (f), the extraction by the extracting device 5 can be performed accurately. Consequently, the reliability of the frequent-occurrence time slot to be displayed can be increased.

While some embodiments have been described above, the present invention is not limited thereto, and may be connected to the server 3 of the managing apparatus 2 without using wires such as the LAN cables (L) (for example, the blood purification apparatuses 1 and the server 3 may be capable of wireless communication with each other). Moreover, the server 3 of the managing apparatus 2 that is connected to the blood purification apparatuses 1 may also be connected to any other independent server installed in a room other than the room related to dialysis treatment (for example, to a server included in any of various systems such as a system storing treatment information (electronic medical charts) and medication information of any other department in the same hospital (in a room different from the dialysis room, such as a room of an internal medicine concerning complications), a nursing support system provided for the nursing of patients, or a reservation or accounting system), so that the server 3 and the other server can transmit and receive various pieces of patient information to and from each other.

The display control device 7 according to each of the above embodiments is capable of displaying the estimated particular parameter on the display 4a of the client PC 4 during the current session of blood purification treatment. Alternatively, the display control device 7 may display the estimated particular parameter on the display 1a of a corresponding one of the blood purification apparatuses 1 during the current session of blood purification treatment. Furthermore, while each of the above embodiments concerns a case where the web-application module 3c for activating the client application 4b is provided in the server 3, the web-application module 3c may alternatively be provided in the client PC 4.

The above embodiments each concern a hemodialysis apparatus capable of performing a treatment such as hemodialysis (HD), ECUM, or HDF (hemodiafiltration). Alternatively, the present invention may be applied to a blood purification apparatus capable of performing another kind of blood purification treatment (such as hemofiltration (HF), continuous slow hemofiltration (CHF), or the like).

The present invention is applicable to any blood purification system, including those having other additional functions and so forth, as long as the following are satisfied: a history includes a particular parameter related to the treatment and that changes with time during the blood purification treatment, and the blood purification system includes an extracting device capable of searching histories accumulated in a storage device and extracting, as an approximate history, a history including the particular parameter approximate to the particular parameter observed at the current time in the current session of blood purification treatment or a history including the particular parameter exhibiting a transition approximate to a transition of the particular parameter observed until the current time in the current session of blood purification treatment; an estimating device that estimates a transition of the particular parameter to be observed after the current time in the current session of blood purification treatment from the approximate history extracted by the extracting device; and a display control device capable of displaying the transition of the particular parameter estimated by the estimating device and the transition of the particular parameter observed in the current session of blood purification treatment simultaneously on a display.

REFERENCE SIGN LIST 1 blood purification apparatus
1a display
2 managing apparatus
3 server
3a storage device
3b communication module
3c web-application module
4 client PC
4a display
5 extracting device
6 estimating device
7 display control device
8 input device
9 blood circuit
10 blood pump
11 dialyzer (blood purifier)
12 duplex pump
13 ultrafiltration pump
14 external indicator lamp
f excluding device

The invention claimed is:

1. A blood purification system comprising:
a blood purification apparatus that provides a blood purification treatment to a patient; and
a managing apparatus remote from the blood purification apparatus and in communication with the blood purification apparatus to transmit and receive information related to the blood purification treatment to and from the blood purification apparatus,
wherein the blood purification apparatus or the managing apparatus includes a display device that displays the information regarding the blood purification treatment,
wherein the managing apparatus includes:
  a client personal computer comprising:
    an input device configured to receive inputs of a particular parameter by a user;
    a display control device that displays a transition of the particular parameter that is estimated by an estimating device and the transition of the particular parameter observed in a current session of blood purification treatment simultaneously on the display device, wherein the display control device and the input device are separately arranged and in communication; and
  a server in communication with the client personal computer, wherein the server comprises:
    a storage device that stores the information on the blood purification treatment in a time course with progress of the current session of blood purification treatment and accumulates the information as a history for each treatment session, and the storage device is connected to a system that stores electronic medical charts or medication information, nursing support system, or an accounting system;
    an extracting device capable of searching histories accumulated in the storage device and extracting, as an approximate history, a history of interest including patients having a same or a close to a same dry weight (DW) to the patient observed at a current time in the current session of blood purification treatment or a history of interest including the particular parameter exhibiting a transition approximate to a transition of the particular parameter observed until the current time in the current session of blood purification treatment, wherein the history of interest includes the particular parameter related to the current session of blood purification treatment and that changes with time during the current session of blood purification treatment, the particular parameter comprising, a Kt/V; and
    the estimating device;
  wherein the estimating device estimates a transition of the particular parameter to be observed after the current time in the current session of blood purification treatment from the approximate history extracted by the extracting device so that the transition of the particular parameter in the current session can be compared with a transition of the particular parameter from the histories to determine if the transition of the current session is normal, and wherein the estimating device:

calculates upper-limits and lower-limits and respective time slots, wherein the upper-limits are connected to one another as an estimated upper-limit transition, and the lower-limits are connected to one another as an estimated lower-limit transition, wherein the estimated upper-limit transition and the estimated lower-limit transition are displayed on a graph with a current transition in a distinguishable manner; and a web-application module that is in communication with the client personal computer so that information on the current session of blood purification treatment is inputted thereto and outputted therefrom;

wherein the blood purification apparatus is multiple blood purification apparatuses;

wherein the transition of the particular parameter observed during the current session of the blood purification treatment and the transition of the particular parameter estimated by the estimating device are displayed simultaneously during the current session of the blood purification treatment;

wherein the managing apparatus sets a flow rate of a pump that circulates fluids within the blood purification system and so that the flow rate of the pump is changed by the managing apparatus based on a comparison between the transition of the particular parameter observed during the current session of the blood purification treatment and the transition of the particular parameter estimated by the estimating device;

wherein the managing apparatus accumulates multiple patients' data, extracts the multiple patients' data, estimates a particular parameter for each of the multiple patients' data, separates the patient's data based on the patient, and displays each of the patient's data on the display device of each of the blood purification apparatuses treating the patients so that the managing apparatus simultaneously is able to provide patient's data to the multiple blood purification apparatuses;

wherein the information on the blood purification treatment acquired during the blood purification treatment is automatically transmitted in the time course with the progress of the blood purification treatment, stored, and accumulated in the storage device of the managing apparatus; and wherein the particular parameters desired to estimate and conditions are inputtable into the input device with a predetermined timing during the treatment, so that the estimating device estimates necessary conditions based on the particular parameters, and the extracting device extracts histories within a scanning range based upon the parameters and the conditions, that begins with a current time, as an approximate history.

2. The blood purification system of claim 1, wherein the managing apparatus includes an excluding device that excludes the histories accumulated in the storage device by the extracting device.

3. The blood purification system of claim 2, wherein the excluding device includes checkboxes that allow a user to select items excluded from the histories accumulated by the extracting device.

4. The blood purification system of claim 3, wherein the checkboxes are configured to exclude patients other than a current patient, patients of a different sex, patients of different ages, patients having a different primary disease, or patients having a different dry weight or test value.

5. The blood purification system according to claim 1, wherein the extracting device is capable of searching the histories including not only the histories of a patient to whom the blood purification treatment is going to be given but also histories of any other patient and extracting an approximate other patient history from the histories of the any other patient.

6. The blood purification system according to claim 5, wherein the display control device is capable of displaying information on the current session of blood purification treatment as a graph with progress of time, and is capable of displaying the transition of the particular parameter estimated by the estimating device with reference to a time axis of the graph.

7. The blood purification system according to claim 5, further comprising an input device through which a past time before the current time in the current session of blood purification treatment is specifiable, wherein the extracting device is capable of searching the histories including the particular parameter approximate to the particular parameter observed at a predetermined time range inputted through the input device and extracting the history of interest.

8. The blood purification system according to claim 1, wherein a past time before the current time in the current session of blood purification treatment is specifiable through the input device, and the extracting device is capable of searching the histories including the particular parameter approximate to the particular parameter observed at a predetermined time range inputted through the input device and extracting the history of interest.

9. The blood purification system according to claim 8, wherein if a past time is specified through the input device, the display control device becomes capable of displaying a graph starting from the past time.

10. The blood purification system according to claim 1, wherein the extracting device searches the histories stored and accumulated in the storage device and extracts a particular parameter that exhibits an approximate transition and wherein the extracting device searches for a history exhibiting a value within a predetermined time range with reference to a predetermined time and the predetermined time range is set in advance for each of different kinds of the particular parameters.

11. The blood purification system according to claim 10, wherein the estimating device analyzes all of the histories extracted by the extracting device.

12. The blood purification system according to claim 1, wherein the display control device is capable of displaying information on the current session of blood purification treatment as a graph with progress of time, and is capable of displaying the transition of the particular parameter estimated by the estimating device with reference to a time axis of the graph.

13. The blood purification system according to claim 1, wherein the display control device is capable of displaying the transition of the particular parameter estimated by the estimating device in a distinguishable manner.

14. The blood purification system according to claim 1, further comprising an input device through which a past time before the current time in the current session of blood purification treatment is specifiable, wherein the extracting device is capable of searching the histories including the particular parameter approximate to the particular parameter observed at a predetermined time range inputted through the input device and extracting the history of interest and wherein the display control device is capable of displaying the transition of the particular parameter estimated by the estimating device in a distinguishable manner.

15. The blood purification system according to claim 1, wherein the extracting device is capable of searching for a specific history, from the histories, within a period between a point where a value of the particular parameter is smaller than a current value of the particular parameter by a predetermined amount.

16. The blood purification system according to claim 1, wherein the display device is included in the blood purification apparatus to display the particular parameter of the patient to a medical worker that the medical worker needs to understand.

17. The blood purification system according to claim 1, wherein the blood purification treatment is a hemodialysis treatment where blood of the patient is purified by a dialyzer while being circulated extracorporeally and that the data is displayed on the display device during the hemodialysis treatment.

18. The blood purification system according to claim 1, wherein the transition of a particular parameter observed, with the extracting device, during the current session of the blood purification treatment and the transition of the particular parameters in a specified one of the histories are superposed on each other and an area of a difference between particular parameter observed and the transition of the particular parameter is calculated and if the area of the difference does not exceed a predetermined threshold then the particular parameter is extracted as an approximate history and if the area of the difference exceeds the predetermined threshold then the particular parameter is not extracted as an approximate history.

19. The blood purification system of claim 1, wherein the Kt/V includes a current Kt/V and an estimated Kt/V that is estimated by the estimating device and the current Kt/V and the estimated Kt/V are simultaneously displayed on the display device as line graphs.

20. The blood purification system of claim 1, wherein an alarm or a warning is provided that notifies a medical worker of an occurrence of an abnormality.

* * * * *